UNITED STATES PATENT OFFICE.

CHARLES JOSEPH HEINEN, OF GENEVA, SWITZERLAND, ASSIGNOR TO THE LABORATOIRES SAUTER, SOCIÉTÉ ANONYME, OF SAME PLACE.

COMPOSITION FOR STERILIZING WATER.

SPECIFICATION forming part of Letters Patent No. 636,986, dated November 14, 1899.

Application filed October 26, 1898. Serial No. 694,583. (No specimens.)

*To all whom it may concern:*

Be it known that I, CHARLES JOSEPH HEINEN, manufacturer, director of the Laboratoires Sauter, Société Anonyme, a citizen of the Republic of Switzerland, residing in Geneva, Switzerland, have invented a new and useful Composition for Sterilizing Water, of which the following is a specification.

This invention relates to an improved composition for sterilizing water, the object of the invention being to provide a composition consisting of such chemical ingredients as will purify and sterilize water in which the composition is placed.

The invention consists in a sterilizing composition composed of an acid alkaline salt, an alkaline peroxid, an alkaline permanganate, a hyposulfite, and a carbonate, and, further, in a sterilizing composition composed of sodium bisulfate, sodium peroxid, potassium permanganate, sodium hyposulfite, and sodium bicarbonate.

In preparing my improved composition for sterilizing water chemical substances belonging, respectively, to the chemical classes named are employed—that is to say, I employ a chemical substance from the class of acid alkaline salts, a chemical substance from the class of alkaline peroxids, a chemical substance from the class of alkaline permanganates, one from the class of hyposulfites, and one from the class of carbonates.

As an example of my improved sterilizing composition formed from substances belonging to the above-cited chemical classes may be given the following, the proportions given being by weight, and those preferably employed: sodium bisulfate, ($NaHSO_4$,) seventy-five; sodium peroxid, ($Na_2O_2$,) twelve; potassium permanganate, ($K_2Mn_2O_8$,) 3.5; sodium hyposulfite, ($Na_2SO_3$,) twelve; sodium bicarbonate, ($NaHCO_3$,) three.

If the given proportions of the above-named ingredients are taken in centigrams, the quantity of sterilizing composition formed will ordinarily be sufficient for one liter of water.

The proportions of the ingredients of the composition, whether the specific chemicals above named or others are employed, are in any case so calculated that when they are dissolved in water they produce successive chemical reactions and saturate the water finally with ozonized oxygen gas.

The composition is preferably made up in the shape of tablets or lozenges for convenient use, which are dropped into the tumbler or other vessel containing the water to be sterilized. On dissolving four reactions take place in quick succession, so as to be almost simultaneous. The sodium peroxid and the sodium bisulfate produce hydrogen peroxid, (first reaction,) which by reaction with the potassium permanganate produces ozonized oxygen or oxygen in its nascent state, (second reaction.) The ozonized oxygen is the effective purifying agent. When the sterilizing or purifying action has taken place, the excess of hydrogen peroxid and the ozone are destroyed by the addition of neutralizing salts, such as sodium hyposulfite and sodium bicarbonate, (third and fourth reactions,) so that neutral salts of alkali and manganese are formed in the solution. These neutral salts are quite harmless and are present in such small quantities that there is no need of eliminating them.

By the composition described and the quick reactions produced when it is dissolved in the water to be purified a convenient means is supplied for domestic purposes and for tourists, soldiers, and others of purifying impure drinking-water.

Having thus described my invention, I claim as new and desire to secure by Letters Patent—

1. A sterilizing composition, consisting of an acid alkaline salt, an alkaline peroxid, an alkaline permanganate, a hyposulfite and a carbonate, substantially as set forth.

2. A sterilizing composition, consisting of sodium bisulfate, sodium peroxid, potassium permanganate, sodium hyposulfite and sodium bicarbonate, substantially as set forth.

In testimony that I claim the foregoing as my invention I have signed my name in presence of two subscribing witnesses.

CHARLES JOSEPH HEINEN. [L. S.]

Witnesses:
E. IMER-SCHNEIDER,
E. F. BARRY.